United States Patent [19]

Gabry

[11] 4,161,080
[45] Jul. 17, 1979

[54] ADJUSTABLE ANIMAL TRAP

[76] Inventor: William Gabry, Box 10, Vavenby, Canada

[21] Appl. No.: 896,845

[22] Filed: Apr. 17, 1978

[51] Int. Cl.² .......................................... A01M 23/30
[52] U.S. Cl. .......................................... 43/82; 43/93
[58] Field of Search ...................... 43/58, 77, 81, 81.5, 43/82, 88, 92, 93, 94, 96, 97

[56] References Cited

U.S. PATENT DOCUMENTS

| | | | |
|---|---|---|---|
| 1,473,242 | 11/1923 | Marshall | 43/81 |
| 1,592,155 | 7/1926 | Redford | 43/82 |
| 2,772,510 | 12/1956 | Rogers | 43/96 |
| 3,747,259 | 7/1973 | Pellowski | 43/92 |
| 3,757,457 | 8/1973 | Martin | 43/81 |

FOREIGN PATENT DOCUMENTS 322941 12/1929 United Kingdom ................. 43/81

Primary Examiner—Nicholas P. Godici
Attorney, Agent, or Firm—Townsend and Townsend

[57] ABSTRACT

A trap having jaws closed by a spring and a winding shaft on which the operating spring is mounted. The shaft is capable of being rotated in one direction by use of a lever to apply a selected amount of tension to the spring and normally is held against rotation in the opposite direction by a ratchet mechanism. The trap has a trigger assembly connected to a bait holder by a release member so that the set trap is released only in response to a pull exerted on the bait holder.

10 Claims, 5 Drawing Figures

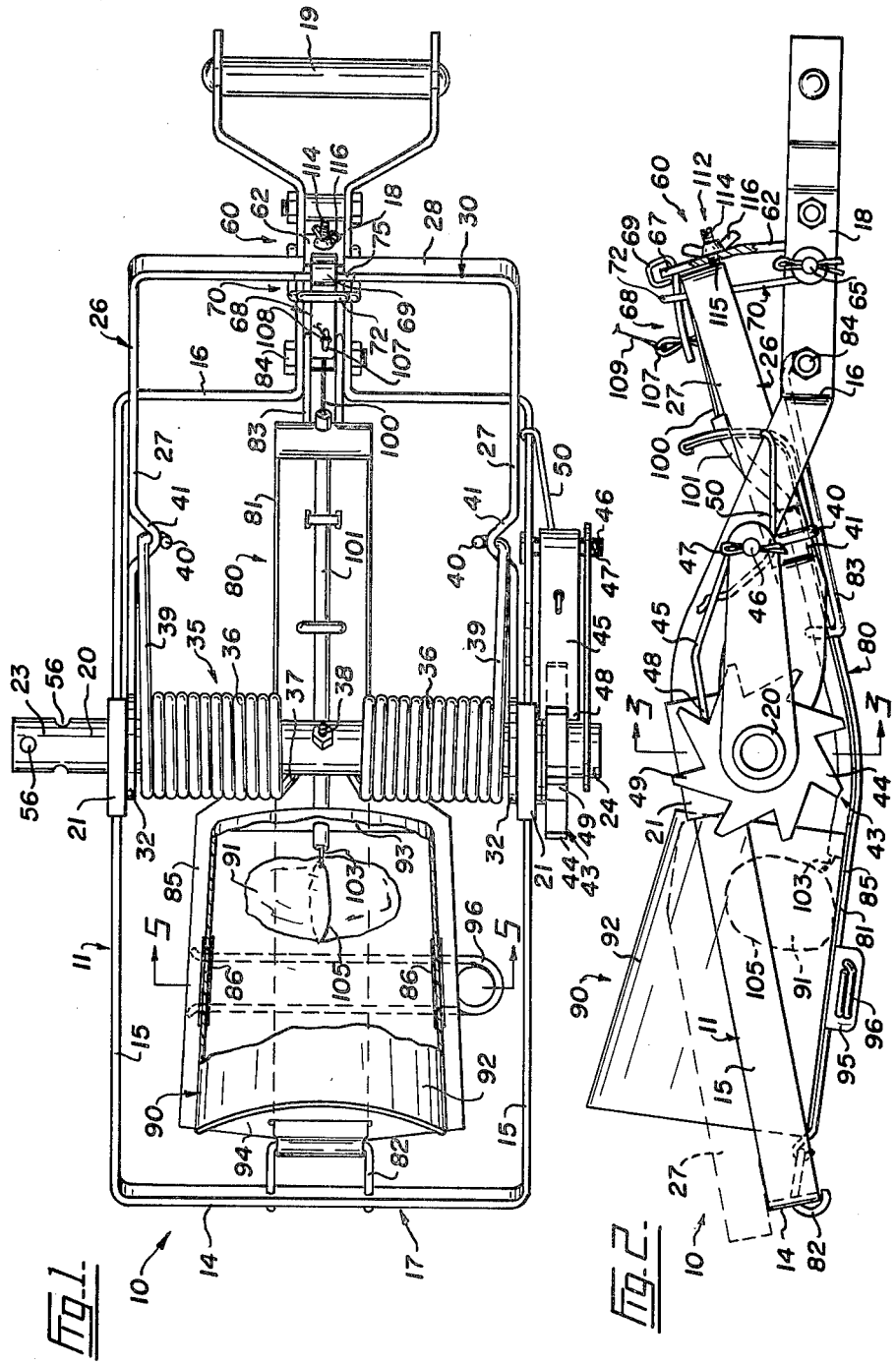

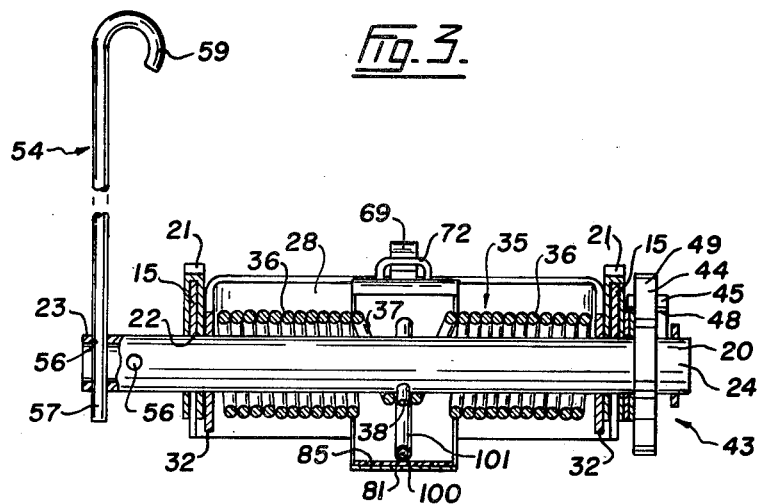
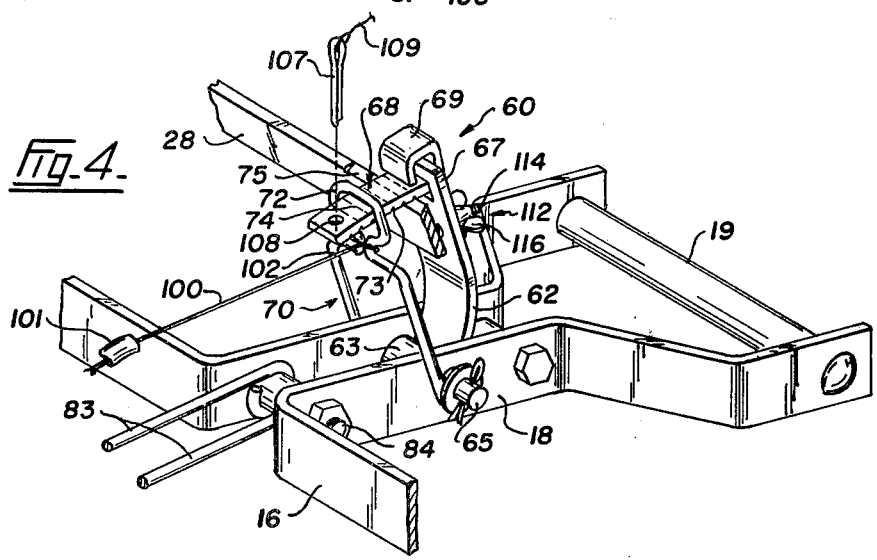
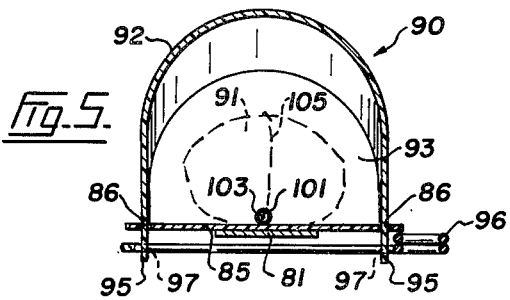

ADJUSTABLE ANIMAL TRAP

BACKGROUND OF THE INVENTION

My invention relates to animal traps and more particularly to a trap which is adjustable to operate effectively in catching fur-bearing animals of various sizes.

Many traps presently in use are difficult and even dangerous to set as can be attested to by trappers called upon to operate them under adverse conditions. A great deal of strength is required to set the larger traps. The striking or clamping force which can be exerted by most spring-powered traps is not readily varied and, as a result, the traps are limited as to where and when they can be used and also with regard to the size and strength of the animals they can trap effectively. Since so many conventional traps have trigger mechanisms which will operate to release the trap if the mechanism is stepped upon, this usually results in an animal being seized by the leg so as to cause unwarranted suffering.

The above mentioned as well as a number of other disadvantages of known traps are overcome by the present invention which is versatile and easy as well as safe to set and which is designed to kill almost instantaneously and humanely by striking the head or neck of the animal. The trap is adjustable so that the striking force can be varied according to the size of the intended victim and other factors. In addition, the trap is sprung only in response to a pulling force on the bait which allows the trigger mechanism to be stepped upon without disturbing the setting or perhaps releasing the trap to catch an animal by the leg.

More particularly, an adjustable animal trap according to the present invention comprises a base frame having a fixed jaw, a winding shaft journalled across the base frame spaced from the fixed jaw, an upper frame swingingly mounted at one end on the winding shaft and having a striker jaw at the opposite end thereof, spring means operatively connecting the winding shaft to the upper frame, control means normally permitting rotation of the winding shaft in one direction only, a trigger assembly for releasably securing the upper frame to the base frame with the trap in a set position, lever means for rotating the winding shaft in said one direction whereby to tension the spring means and apply a selected spring pressure biasing the trap towards a shut position, bait support means carried by the fixed jaw and including a bait holder, and a release member operatively connecting the trigger assembly to the bait holder whereby the upper frame is released and the trap is allowed to snap shut only when a pulling force is exerted on the bait holder.

In drawings which illustrate a preferred embodiment of the invention,

FIG. 1 is a plan view of the present invention showing the adjustable animal trap in a set position, FIG. 2 is a side elevational view of the trap in the set position and showing, in dotted lines, the location of an upper frame of the device when the trap is closed or has snapped shut, FIG. 3 is a vertical section taken on the line 3—3 of FIG. 2 and showing a winding shaft and associated parts of the trap, FIG. 4 is perspective view showing a trigger assembly of the trap, and FIG. 5 is a transverse section taken on the line 5—5 of FIG. 1 and showing details of a bait cover for the trap.

Referring to the drawings, the numeral 10 indicates generally a trap having a base frame 11. The open, rectangular base frame 11 has a front bar 14, parallel side bars 15, and a rear bar 16. Bar 14 and adjoining few inches of the side bars 15 provides the base frame with a fixed jaw which is generally indicated by the numeral 17 in FIG. 1 only. The frame portions which form the rear bar 16 are shaped to provide a rearwardly projecting and centrally disposed extension 18 which is expanded laterally to support a hand grip 19. In FIG. 2, the extension 18 will be seen to be substantially coplanar with the front and rear bars of the frame 11 while the side bars 15 are cranked upwardly towards the center of the trap.

The frame 11 is spanned by a winding shaft 20 which is journalled in bearings 21, see FIGS. 2 and 3. These bearings are removably mounted on the base frame 11 and depend from the underside of bars 15 slightly forward of the highest part of this frame. In FIG. 3, the shaft 20 is shown lodged in notches 22 formed in the undersides of the side bars 15 and being supported within these notches by the removable bearings 21. Opposite ends 23 and 24 of the shaft 20 project laterally beyond the side bars 15 as can be seen in FIGS. 1 and 3.

Swingingly mounted on the winding shaft 20 is an upper frame generally indicated at 26. The upper frame 26 is also open and rectangular and has side bars 27 connected at one end by a cross bar 28. Bar 28 and adjoining few inches of the bars 27 provide the upper frame with a striker jaw generally indicated at 30 in FIG. 1 only. Bushings 32 (FIGS. 1 and 3) are provided on the ends of the side bars 27 opposite the bar 28, the shaft 20 rotatably extending through these bushings. Thus, the upper frame 26 is rotatably mounted on the shaft 20 so as to swing above the longitudinal axis of the shaft.

Mounted on the shaft 20 between the bushings 32 is a coil spring 35. This high-tension spring has two spaced-apart coil portions 36 connected by a loop 37 formed in the spring wire, the loop passing around a pin 38 which projects radially through the center of the shaft 20. At opposite ends of the coil portions 36, the spring wire is straightened to provide side arms 39 which extend alongside the side bars 27 and which are located within those bars. Ends 40 of the arms 39 are hooked as shown in FIG. 1 to pass around inwardly projecting bands 41 formed in the side bars 27 of the upper frame. When the shaft 20 is held against rotation and torsion is applied to the spring 35, the upper frame 26 is biased to swing about the winding shaft towards the closed position of the trap.

Shaft 20 is adapted to be held against rotation in one direction by control means generally indicated at 43, see FIGS. 1, 2 and 3. The means 43 comprises a ratchet wheel 44 which is non-rotatably secured to the projecting end 24 of the winding shaft. A pawl 45 is pivotally mounted on a pin 46 which projects laterally from the adjacent side bar 15, the pin being fitted with a cotter pin 47. This pawl has a free end 48 which rides over teeth 49 on the ratchet wheel 44. A spring 50 is mounted on the bolt 46 so that opposite ends of the spring engage the adjacent side bar 15 and the pawl 45 respectively whereby to hold the pawl end 48 in engagement with the teeth 49 on the ratchet wheel.

A considerable force must be exerted in order to wind up the spring 35 and therefore the trap 10 is provided with a lever 54, see FIG. 3 only. The end 23 of the winding shaft is provided with transverse openings 56 to receive an end 57 of the lever. This arrangement allows a person setting the trap to use the lever 54 to rotate the shaft 20 thereby to apply the leverage needed to tension the spring 35. The lever 54 has a hooked end 59 which can be inserted under the pawl 45 so as to release the ratchet mechanism if such action should ever be necessary.

The trap 10 is adapted to be held in the set position by use of a trigger assembly generally indicated at 60. As shown in FIGS. 1 and 2, as well as in detail FIG. 4, the assembly 60 comprises an arm 62 which has an eyed end 63 loosely encircling a pin 65 carried between the side bars 18 of the base frame 11. The pivotally mounted arm 62 has an opposite or free end 67 to which a latch 68 is hingedly connected as at 69. The hinge connection 69 is such that the latch 68 is able to swing towards and away from the arm 62 with a scissor-like action.

The latch 68 is downwardly curved to a slight extent so as to extend over the cross bar 28 of the upper frame when the trap is in the set position. In this position, a retainer 70 engages and holds the latch against the trap-shutting pressure applied by the spring 35. The retainer 70 preferably is a length of spring wire shaped to provide a loop 72 which is adapted to slidably extend over the free end of the latch 68 as shown in FIG. 4. The opposite end of the retainer is mounted on the hinge pin 65 so that the retainer can swing towards and away from the arm 62. A number of longitudinally-spaced and transversely extending notches 73 are provided on the underside of the latch 68. Preferably, these notches are marked by lines 74 appearing on the upper surface of the latch. The upper edge of the cross bar 28 is bevelled as at 75 to enter a selected one of the notches 73.

Referring again to FIGS. 1, 2 and 5, the trap 10 is provided with bait supporting means generally indicated at 80. The means 80 is shown to comprise a longitudinally-extending strap 81 which is secured by a connector 82 to the front bar 14. Another connector 83 attaches the opposite end of the strap to a bolt 84 extending between the transversely spaced sides of the extension 18. A small substantially rectangular plastic tray 85 rests on the strap just forward of the spring 35, the tray being provided with side slots 86.

The present trap is equipped with a cover preferably plastic, of a suitable size to cover the piece of meat or the like used to bait the trap. In FIGS. 1 and 2, a cover 90 is shown enclosing a piece of bait 91. This cup-like cover has a tapered peripheral wall 92, a rear wall 93, and an entrance opening 94 of a predetermined size. Wall 92 is provided with downwardly-projecting tabs 95 (FIG. 5) which project through the slots 86 in the tray. A spring clip 96 passes through holes 97 in the tabs to extend below the strap 81 and thereby secure the cover 90 against accidental dislodgement.

The strap 81 also carries a release cord 100 formed of a length tough, hard-wearing plastic. Cord 100 slidably extends through a sheath 101 of similar material, the sheath being suitably secured to the strap 81. One end 102 of the cord is secured to the retainer 70 below the loop 72. An opposite end 103 of the cord 100, see particularly FIG. 1, is fitted with a short length of plastic cord which provides a holder 105 for the bait 91, see FIGS. 1 and 2. Thus, the bait is held within the cover 90 near the rear wall 93 and can only be reached through the entrance opening 94 in the cup-like cover.

From the foregoing description, it will be apparent that the set trap can only be released to snap shut when a forwardly directed pull is exerted on the bait 91 such as would occur when an animal attempted to snatch the bait by entering his jaws through the entrance opening 94 of the cover. When the cord 100 is pulled a sufficient distance through sheath 101, the retainer 70 is drawn off the latch 68 and the trap can snap shut.

In order to safeguard the user of the present trap, it is fitted with a safety pin 107, see FIGS. 2 and 4. This pin is adapted to project through a hole 108 formed in the extreme forward end of the latch 68. The loop 72 of the retainer cannot be drawn off the latch when the safety pin is in the hole. A cord 109 is attached to the safety pin to facilitate withdrawal of the pin from the hole 108 when the trap is in the set position and is locked against accidental release.

The trigger assembly 60 is provided with adjusting means generally indicated at 112 whereby the trigger response can be adjusted to some extent. The means 112 is shown best in FIG. 2 to comprise a short bolt 114 which is mounted in a threaded hole 115 formed in the arm 62 of the assembly. A wing-type lock nut 116 is fitted to the bolt. Normally, the arm 62 is located near the rear face of the bar 28 with the front end of the bolt 114 in contact with that face of the bar. The bevelled edge 75 of the cross bar 28 is seated in one of the notches 73 and the loop 72 is located near the safety pin 107. When the edge 75 is in the rearmost notch 73, little effort is required to pull the retainer 70 off the latch once the safety pin 107 is removed so that the trigger assembly is then adjusted to maximum lightness or sensitivity. The amount of effort can be increased progressively by moving the latch 68 to the rear so that the bevelled edge 75 engages a notch nearer to the hole 108. Fine adjustment of the sensitivity is made possible by use of the bolt 114 which always has contact with the bar 28 when the trap is set.

A convenient way to set the trap is to start with little or no tension in the spring 35. The striker jaw can then be pulled back from the dotted to the solid line position shown in FIG. 2 whereupon the trigger assembly 60 is adjusted as described above and the safety pin 107 is inserted through the hole 108. The trap can now be handled in safety. The front bar 14 is placed in contact with the ground and the trap is held upright by holding the hand grip 19. The lever 54 is fitted to the shaft so as shown in FIG. 3 and a cranking force is applied to wind up the spring 35 preferably to about three quarters maximum tension. Once the cranking lever 54 is removed, the trap is ready to be baited and which can be done without fear of accidental release and possible injury to the trapper. The amount of energy which can be stored by the spring is very great and therefore it is important that provision be made for safe handling particularly during the procedure followed to install the trap in a selected location.

The adjustable animal trap 10 will operate effectively in a number of locations on land and in snow, or in water and under ice if muskrat or beaver, for example, are to be trapped. One commonly used setting is with the trap attached to a tree or a stump. A length of wire (not shown) is secured to the hand grip 19 or adjacent parts of the base frame to suspend the trap from the tree in a suitable operating position. The trap can be laid in a hole dug into the ground to simulate the den of a coyote or other den-dwelling animal. Also, the trap can be set underwater to catch beaver or the like. It should be noted that, when the trap is set in a simulated den or under water, the cover 90 is not absolutely necessary and may be removed since the animal is forced to approach the bait from the front because of such a setting.

The trapper having baited and set the trap, at the last possible moment pulls out the safety pin 107 and does not again move his hands into the vicinity of the trap. Most animals will instinctively approach the trap from the front end and normally will cautiously extend its head and neck over the front bar 14 of the base frame to poke its nose into the bait cover 90 and tug at the bait. This tugging force is transmitted through bait holder 105 and the release cord 100 to the retainer 70 which is pulled off the latch 68. The upper frame 26 is released by this sequence of movements and snaps forwardly under the very large force previously stored in the spring 35. This closing action is so quick and powerful that the animals head is generally caught between the fixed jaw 17 and the striker jaw 30 so that its neck is broken.

The slain animal is held by the trap since the jaws 17 and 30 are clamped shut by the pressure remaining in the spring 35. To release the animal, the trapper uses the lever 54 and this is done by inserting the hooked end 59 of the lever under the pawl 45 so that the pawl can be lifted off the tooth 49 it is then engaging whereupon the spring can fully unwind and the two jwas can readily be separated.

From the foregoing, it will be apparent the trap 10 is capable of killing an animal almost instantly and without causing severe damage to the pelt. An animal the size of a mink for example, can exert the tugging force need to release the trap but relatively small and unwated animals such as squirrels, and birds such as ravens, do not have the strength to do so.

An important feature of the present trap is that it cannot be released except by a tug on the bait. An animal can step on the cover 90 or even paw at the bait in an attempt to remove it but this does not trigger the trap. Thus, an animal is never caught by the leg to suffer needlessly as they do with conventional leg-hold traps. The spring pressure can be varied as required to suit a particular setting or to ensure that sufficient striking force is available to kill some of the larger animals. The construction of the trap is such that it can readily be dismantled for shipment or storage and any parts which might become worn or damaged in use are easily replaced.

I claim:

1. An adjustable animal trap comprising a base frame having a fixed jaw, a winding shaft journalled across the base frame spaced from the fixed jaw, an upper frame swingingly mounted at one end on the winding shaft and having a striker jaw at the opposite end thereof, spring means operatively connecting the winding shaft to the upper frame, control means normally permitting rotation of the winding shaft in one direction only, a trigger assembly for releasably securing the upper frame to the base frame with the trap in a set position, lever means for rotating the winding shaft in said one direction whereby to tension the spring means and apply a selected spring pressure biasing the trap towards a shut position, bait support means carried by the base frame and including a bait holder near the fixed jaw, and a release member operatively connecting the trigger assembly to the bait holder whereby the upper frame is released and the trap is allowed to snap shut only when a pulling force is exerted on said bait holder.

2. An adjustable animal trap as claimed in claim 1, in which said bait support means includes a cover enclosing the bait holder and having an entrance opening providing the only access to the bait holder.

3. An adjustable animal trap as claimed in claim 1, in which said trigger assembly comprises a latch pivotally mounted on the base frame to extend over the striker jaw and a retainer connected to the base frame and having an end releasably engaging the latch, said release member connecting the bait holder to the retainer.

4. An adjustable animal trap as claimed in claim 3, and including a safety pin releasably engaging the latch to prevent disengagement of the retainer.

5. An adjustable animal trap comprising a base frame having a fixed jaw, a winding shaft journalled across the base frame spaced from the fixed jaw, an upper frame swingingly mounted at one end thereof on the winding shaft and having a striker jaw at the opposite end movable towards and away from the fixed jaw, a spring secured to the winding shaft and attached to the upper frame, a ratchet mechanism operatively connecting the winding shaft to the base frame normally to control rotation of said shaft in one direction, a trigger assembly for releasably securing the upper frame to the base frame to set the trap, lever means for rotating the winding shaft in said one direction and actuating the ratchet mechanism whereby to tension the spring and apply spring pressure biasing the striker jaw towards the fixed jaw, said trigger assembly comprising an arm pivotally mounted at one end thereof on the base frame, a latch pivotally connected to an opposite end of the arm to extend over the striker jaw, a retainer connected to the base frame and having an end releasably engaging the latch, bait support means carried by the base frame near the fixed jaw and including a bait holder, and a flexible release member connecting the bait holder to the retainer whereby the upper frame is released and the trap is allowed to snap shut only when a pulling force is exerted on the bait holder.

6. An adjustable animal trap as claimed in claim 5, in which said bait support means includes a cover removably secured to the bait support means to enclose the bait holder and having an entrance opening of a predetermined size providing the only access to said bait holder.

7. An adjustable animal trap as claimed in claim 6, and including a safety pin releasably engaging the latch to prevent disengagement of the retainer.

8. An adjustable animal trap as claimed in claim 7, and means for selectively adjusting the extent of the engagement between the latch and the retainer whereby to affect the sensitivity of the trigger assembly.

9. An adjustable animal trap as claimed in claim 8, in which said latch has longitudinally spaced notches for selectively receiving an edge of the striker bar.

10. An adjustable animal trap as claimed in claim 6, in which said base frame has a rear extension, and a hand grip carried by the rear extension.

* * * * *